(12) United States Patent
Fu et al.

(10) Patent No.: US 8,964,756 B2
(45) Date of Patent: Feb. 24, 2015

(54) SIGNALING CONTROL METHOD AND SYSTEM FOR SERVICE ESTABLISHMENT BASED ON G.709

(75) Inventors: Xihua Fu, Shenzhen (CN); Xinling Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 246 days.

(21) Appl. No.: 13/637,141

(22) PCT Filed: Sep. 16, 2010

(86) PCT No.: PCT/CN2010/077000
§ 371 (c)(1),
(2), (4) Date: Oct. 22, 2012

(87) PCT Pub. No.: WO2011/116594
PCT Pub. Date: Sep. 29, 2011

(65) Prior Publication Data
US 2013/0216222 A1    Aug. 22, 2013

(30) Foreign Application Priority Data
Mar. 25, 2010   (CN) .......................... 2010 1 0143492

(51) Int. Cl.
*H04L 12/28*     (2006.01)
*H04L 12/56*     (2006.01)
(Continued)

(52) U.S. Cl.
CPC .......... *H04Q 11/0062* (2013.01); *H04J 3/1652* (2013.01); *H04J 2203/006* (2013.01);
(Continued)

(58) Field of Classification Search
USPC ......... 370/231, 235, 236, 373, 377, 384, 385, 370/395.2, 401, 410, 426, 496, 522, 524
See application file for complete search history.

(56) References Cited

U.S. PATENT DOCUMENTS 8,290,367 B2 * 10/2012 Reina et al. ..................... 398/57
2002/0018258 A1 * 2/2002 Schmitt et al. ................ 359/118
(Continued)

FOREIGN PATENT DOCUMENTS

CN    1309216 C    4/2007
CN    101645842 A  2/2010

OTHER PUBLICATIONS

European Search Report for EP10848259, Feb. 18, 2014.*
(Continued)

*Primary Examiner* — Warner Wong
(74) *Attorney, Agent, or Firm* — Ling Wu; Stephen Yang; Ling and Yang Intellectual Property

(57) ABSTRACT

A signaling control method for service establishment based on G.709 is provided in the present invention, including: a control plane obtaining routing information of an end-to-end service to be established, information of a gateway network element passed by end-to-end service routing and a multi stage multiplexing capability selected for the gateway network element, initiating an end-to-end connection establishment process, and sending an end-to-end connection establishment signaling to nodes passed by the end-to-end service routing, wherein, the end-to-end connection establishment signaling contains the multi stage multiplexing capability selected for the gateway network element passed by the end-to-end service routing, and a corresponding multi stage multiplexing capability is configured on the gateway network element. A signaling control system for service establishment based on G.709 is also provided in the present invention. In the method and system, the interconnection between old devices and new devices is better implemented.

14 Claims, 9 Drawing Sheets

(51) Int. Cl.
*H04Q 11/00* (2006.01)
*H04J 3/16* (2006.01)

(52) U.S. Cl.
CPC . *H04J2203/0089* (2013.01); *H04Q 2011/0064* (2013.01); *H04Q 2011/0073* (2013.01); *H04Q 2011/0088* (2013.01)
USPC ........................................ 370/395.2; 370/401

(56) References Cited

U.S. PATENT DOCUMENTS

| | | | |
|---|---|---|---|
| 2004/0076151 A1* | 4/2004 | Fant et al. | 370/389 |
| 2007/0269218 A1* | 11/2007 | Zhang | 398/140 |
| 2008/0075008 A1 | 3/2008 | Kano | |
| 2008/0219268 A1* | 9/2008 | Dennison | 370/395.2 |
| 2010/0008262 A1* | 1/2010 | Fujii et al. | 370/254 |
| 2010/0226647 A1* | 9/2010 | Sun | 398/45 |
| 2010/0254709 A1* | 10/2010 | Narvaez et al. | 398/98 |
| 2011/0116793 A1* | 5/2011 | Zhang et al. | 398/43 |
| 2013/0202294 A1* | 8/2013 | Fu et al. | 398/45 |
| 2013/0294773 A1* | 11/2013 | Fu et al. | 398/45 |

OTHER PUBLICATIONS

European Search Report for EP11849034, Feb. 18, 2014.*
Zhou, Xin. Hardware design of optical transmission unit in the optical transport network. Chinese master's thesis full-text database information science and technology. Apr. 15, 2009, No. 4. see the pp. 7-16, ISSN 1674-0246.
International Search Report for PCT/CN2010/077000 dated Dec. 2, 2010.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type       (5) (IANA)         |        Length                 |
+-+-+-+-+-+-+-+-+-+-+-+-+-+-+-+-+-+-+-+-+-+-+-+-+-+-+-+-+-+-+-+-+
| Num |      Multi Stages Multiplexing    Sub-TLV...            |
+-+-+-+-+-+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type       (5) (IANA)         |     Length       (15)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1 0|0 0 1 1|
+-+-+-+-+-+-+-+-+-+-+-+-+-+-+-+-+
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type       (5) (IANA)         |     Length       (15)         |
+-+-+-+-+-+-+-+-+-+-+-+-+-+-+-+-+-+-+-+-+-+-+-+-+-+-+-+-+-+-+-+-+
|0 1 0|0 0 0 0|0 0 1 1|0 1 0 0|
+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type       (5) (IANA)         |     Length       (23)         |
+-+-+-+-+-+-+-+-+-+-+-+-+-+-+-+-+-+-+-+-+-+-+-+-+-+-+-+-+-+-+-+-+
|1 0 0|0 0 0 0|0 0 0 1|0 0 1 0|0 0 1 1|0 1 0 0|
+-+-+-+-+-+-+-+-+-+-+-+-+-+-+-+-+-+-+-+-+-+-+-+-+
```

SIGNALING CONTROL METHOD AND SYSTEM FOR SERVICE ESTABLISHMENT BASED ON G.709

TECHNICAL FIELD

The present invention belongs to the field of optical network transmission, and particularly, to a method and system for signaling control for service establishment based on G.709 in an automatic switching optical network of optical transport network.

BACKGROUND OF THE RELATED ART

The Optical Transport Network (OTN) is a technique of digital wrapper disclosed in 1999 to solve the problem of high capacity transmission for high speed Time Division Multiplexing (TDM) signals. The OTN defined in the version of 2003 can provide functions such as transmission, multiplexing, protection and monitoring management and so on for client layer signals, where the supported client layer signals are mainly Ethernet signals supported by the Synchronous Transmission Mode Level N (STM-N) and Asynchronous Transmission Mode (ATM) and supported through the Generic Framing Procedure (GFP), and the defined rate levels are 2.5G, 10G and 40G. With the Internet Protocol (IP) normalization for the transport network bearing signals and the popularization of a 10G Local Area Network (LAN) interface, the bearing of 10 Gigabit Ethernet (10GE) on the OTN becomes an important problem. Therefore, the International Telecommunication Union Telecommunication Standardization Sector (ITU-T) developed a supplement standard (i.e. the G.sup43 standard) to the G.709 in 2007, which defined the mode of the OTN transmitting 10GE signals.

A multiplexing system of a traditional OTN is extremely simple. The rate levels are 2.5G, 10G and 40G, which correspond to an Optical channel Data Unit (ODU)1, ODU2, ODU3 respectively. Services of Constant Bit Rate (CBR) are mapped to corresponding ODUks in the way of Asynchronous Mapping Procedure (AMP) or Bit-synchronous Mapping Procedure (BMP), Packet services are mapped to the ODUks in the way of GFP, and then these ODUks are mapped to corresponding Optical channel Transmission Units (OTUks. Certainly, the ODUs with low rate level can also be multiplexed to the ODUs with high rate level as shown in FIG. 1.

In order to adapt for multiple services, a new concept of High Order (HO) ODU and Low Order (LO) ODU is introduced in the OTN. As shown in FIG. 2, from the left in FIG. 2, the first column is the LO ODU, the rate level, such as ODU3, in each frame is marked as ODU3 (L), where L is precisely the Low Order. The second column is the HO ODU, the rate level, such as ODU3, in each frame is marked as ODU3 (H), where H is precisely the High Order. The HO/LO is identical with the concept of high order/low order container in a Synchronous Digital Hierarchy (SDH). The LO ODU is equivalent to that a service layer is used to adapt services with different rates and formats, the HO ODU is equivalent to that a tunnel layer is used to provide transmission capability with certain bandwidths, and this layering structure supports the separation between a service board card and a circuit board card, and thus may bring more flexibility and economy to the network deployment.

Compared with the G.709, the G.709 Amendment 3 and G.sup 43 have changed greatly, and new signal types are introduced, which includes ODU0, ODU2$e$, ODU3$e$1, ODU3$e$2, flexible ODU (ODUflex) and ODU4. The new optical channel data unit ODU0 with a rate of 1.244 Gb/s is firstly introduced, the ODU0 can be cross-connected independently, and also can be mapped to the high order ODU (such as the ODU1, ODU2, ODU3 and ODU4). In order to adapt to the transmission for 100GE services, the ODU4 is introduced, and the rate is 104.355 Gb/s.

A mapping and multiplexing mode of 2.5G branch timing sequence of the original version G.709 is kept for the ODU1 mapped to the ODU2 and ODU3 and the ODU2 mapped to the ODU3, and a 1.25G branch timing sequence for the ODU1 mapped to the ODU2 and ODU3 and the 1.25G branch timing sequence for the ODU2 mapped to the ODU3 are added. All the other new rates (the ODU0, ODU2$e$ and ODUflex) are mapped to the ODU1, ODU2, ODU3 and ODU4 in the way of the mapping and multiplexing mode of 1.25G branch timing sequence. According to the G.sup 43, the ODU2$e$ can be mapped to a 2.5G branch timing sequence of the ODU3$e$1, and the ODU2$e$ also can be mapped to the 1.25G branch timing sequence of the ODU3$e$1. Most of the low order ODUs have the same number of branch timing sequences in the high order. However, the ODU2$e$ is an exception, and the ODU2$e$ needs to occupy 9 1.25G branch timing sequences or 5 2.5G branch timing sequences in the ODU3, but needs to occupy 8 1.25G branch timing sequences in the ODU4. FIG. 3 is a detailed mapping and multiplexing path structure of the G.709 standard and G.sup43 standard.

The idea of Flexible ODU was widely discussed at the ITU-T Q11/SG15 intermediate meeting in September, 2008 and the ITU-T SG15 plenary meeting in December, 2008 initially. The initial idea of Flexible ODU is to provide bit transparent transmission of the OTN for client signals with arbitrary bit rates. The ODUflex is currently expected to be used for supporting those new bit rates which can be mapped to the ODU2, ODU3 or ODU4 effectively. The ODUflex is taken as one low order ODU, and one ODUflex occupies the number of branch timing sequences with arbitrary integral multiples of the high order ODUk. The ODUflex bandwidth can be adjusted dynamically.

Currently, the size of Packet ODUflex is recommended to be: n×1.24416 Gbit/s±20 ppm (1≤n≤80), and the size of CBR ODUflex is 239/238 times of that of the client signal rate. The newly defined ODUflex will not provide mapping for the client signals which have been mapped to the ODU0, ODU1, ODU2 and ODU3 any more. With regard to CBR client signals, it is the first choice to map the client signals to the ODUflex through the BMP, and the ODUflex rate is 239/238 times of the client signal rate (above the 2.5G client signal rate). With regard to Packet service client signals, it is currently discussed that the client signals are mapped to the ODUflex using the GFP; ODUflex=n*1.24416G, wherein 1≤n≤80; and the ODUflex bit rate is integer multiples of the number of branch timing sequences of the high order ODUk.

After the G.709 standard of version 2003 is released, OTN devices are deployed abundantly after several years of development. The latest G.709 standard has been changed largely. After the newly deployed OTN devices are loaded with control planes, one end-to-end label switching path may control many old devices and new devices simultaneously, whereby the old devices can only support a 2.5G branch timing sequence unit, and the new devices can support both the 2.5G branch timing sequence unit and 1.25G branch timing sequence unit. When one end-to-end label switching path goes through the old devices and new devices, the related interconnections during the management of end-to-end services become a technical problem existing in the reality.

As shown in FIG. 4, the OTN has been deployed. The implementation of all node devices in the OTN is based on the G.709 standard version released in 2003, and each node in the network does not support the ODU0 and ODUflex but is based on the 2.5G branch timing sequence. With the larger-scale application of data services, operators need to introduce applications of the ODU0 and ODUflex into the existing network. When the applications of the ODU0 and ODUflex are introduced into the existing network, a problem of interconnection between the networks supporting the 1.25G Timing Sequence (TS) and the deployed networks supporting the 2.5G TS exists. If no other technologies are introduced, the operators have to upgrade all nodes in the existing network to support the ODU0 and ODUflex, and this certainly will destroy the OTNs which have been invested by the operators.

One end-to-end ODUk service may go through many old devices and new devices simultaneously, whereby the old devices can only support the 2.5G branch timing sequence unit, and the new devices can support both the 2.5G branch timing sequence unit and 1.25G branch timing sequence unit. When one end-to-end ODUk goes through the old devices and new devices, the related interconnections during the management of end-to-end services become a technical problem existing in the reality. Meanwhile, there also exists the problem of introducing services of the ODU0 and ODUflex into the OTN and interacting with the deployed networks.

SUMMARY OF THE INVENTION

The technical problem required to be solved by the present invention is to provide a method and system for signaling control for service establishment based on G.709 in an automatic switching optical network of optical transport network, to implement an interconnection between old devices and new devices, which can introduce new services, and also can protect network resources which have been deployed by operators.

In order to solve the above problem, the present invention provides a method for signaling control for service establishment based on G.709, which comprises:

a control plane obtaining routing information of an end-to-end service to be established, information of a gateway network element passed by end-to-end service routing and a multi stage multiplexing capability selected for the gateway network element, initiating an end-to-end connection establishment process, and sending an end-to-end connection establishment signaling to nodes passed by the end-to-end service routing, wherein, the end-to-end connection establishment signaling contains the multi stage multiplexing capability selected for the gateway network element passed by the end-to-end service routing, and the gateway network element performs configuration according to a corresponding multi stage multiplexing capability.

The above method can further be characterized in that:
the end-to-end connection establishment signaling further carries the following information: appointing each pair of gateway network elements for which tunnels need to be established.

The above method can further be characterized in that:
in the step of the gateway network element performing configuration according to a corresponding multi stage multiplexing capability, when the end-to-end connection establishment signaling reaches the gateway network element, the gateway network element performs configuration according to the multi stage multiplexing capability carried in the end-to-end connection establishment signaling; or when the end-to-end connection establishment signaling reaches the gateway network element, the multi stage multiplexing capability carried in the end-to-end connection establishment signaling is saved on the gateway network element, and the gateway network element performs configuration according to the saved multi stage multiplexing capability when an end-to-end connection establishment response signaling reaches the gateway network element. The above method can further be characterized in that:

a user presets a policy, and the gateway network element decides to perform configuration according to the multi stage multiplexing capability when receiving the end-to-end connection establishment signaling according to the policy; or a user presets a policy, and the gateway network element decides to perform configuration according to the multi stage multiplexing capability when receiving the end-to-end connection establishment response signaling according to the policy.

The above method can further be characterized in that:
the end-to-end connection establishment signaling is a Path message, and the end-to-end connection establishment response signaling is a Resv message. The above method can further be characterized in that:

in the step of a control plane sending an end-to-end connection establishment signaling to nodes passed by the end-to-end service routing, the control plane carries the multi stage multiplexing capability selected for the gateway network element on a subject of the gateway network element recorded in an explicit route object or an Explicit Route Boundary Object (ERBO).subject The above method can further be characterized in that:
the step of the control plane carries the multi stage multiplexing capability selected for the gateway network element on a subject of the gateway network element recorded in an explicit route object or an Explicit Route Boundary Object (ERBO) comprises:

inserting attribute information into the subject, using the attribute information to carry the multi stage multiplexing capability selected for the gateway network element, and the attribute information containing a type field, a length field, a multi stage multiplexing layer number information field and a multi stage multiplexing signal type field, wherein:

the type field is configured to: indicate a type of the attribute information;

the length field is configured to: indicate lengths of the multi stage multiplexing layer number information field and the multi stage multiplexing signal type field;

the multi stage multiplexing layer number information field is configured to: indicate a number of layers of multi stage multiplexing; and the multi stage multiplexing signal type field is configured to: indicate each signal type for the multi stage multiplexing.

The present invention further provides a system for signaling control for service establishment based on G.709, comprising a control plane and a gateway network element, wherein:

the control plane is configured to: after obtaining routing information of an end-to-end service to be established, information of a gateway network element passed by end-to-end service routing and a multi stage multiplexing capability selected for the gateway network element, initiate an end-to-end connection establishment process, and send an end-to-end connection establishment signaling to nodes passed by the end-to-end service routing, wherein the end-to-end connection establishment signaling contains the multi stage multiplexing capability selected for the gateway network element passed by the end-to-end service routing;

the gateway network element is configured to: perform configuration according to a corresponding multi stage multiplexing capability.

The above system can further be characterized in that:
the end-to-end connection establishment signaling further carries the following information: appointing each pair of gateway network elements for which tunnels need to be established.

The above system can further be characterized in that:
the gateway network element is configured to: when the end-to-end connection establishment signaling reaches, perform configuration according to the multi stage multiplexing capability carried in the end-to-end connection establishment signaling; or when the end-to-end connection establishment signaling reaches, save the multi stage multiplexing capability carried in the end-to-end connection establishment signaling, and perform configuration according to the saved multi stage multiplexing capability when an end-to-end connection establishment response signaling reaches.

The above system can further be characterized in that:
the gateway network element is further configured to: according to a policy preset by a user, decide to perform configuration according to the multi stage multiplexing capability when the end-to-end connection establishment signaling reaches or the end-to-end connection establishment response signaling reaches.

The above system can further be characterized in that:
the end-to-end connection establishment signaling is a Path message, and the end-to-end connection establishment response signaling is a Resv message.

The above system can further be characterized in that:
the control plane is configured to: carry the multi stage multiplexing capability selected for the gateway network element on a subject of the gateway network element recorded in an explicit route object or an Explicit Route Boundary Object (ERBO).

The above system can further be characterized in that:
the control plane is configured to: insert attribute information into the subject, and use the attribute information to carry the multi stage multiplexing capability selected for the gateway network element, wherein the attribute information contains a type field, a length field, a multi stage multiplexing layer number information field and a multi stage multiplexing signal type field, wherein:
the type field is configured to: indicate a type of the attribute information;
the length field is configured to: indicate lengths of the multi stage multiplexing layer number information field and the multi stage multiplexing signal type field;
the multi stage multiplexing layer number information field is configured to: indicate a number of layers of multi stage multiplexing; and
the multi stage multiplexing signal type field is configured to: indicate each signal type of the multi stage multiplexing.

In the present invention, it is suggested that when the control plane establishes an end-to-end ODUk service in a distributed signaling mode, a signaling message carries multi-stage multiplexing/demultiplexing capability (method) information selected by a path computation entity for the gateway network element. When the signaling (Path or Resv) message carrying the selected multi stage multiplexing/demultiplexing capability (method) information on the gateway network element goes through the gateway network element, the carried multi stage multiplexing method is configured to a data plane for an end-to-end ODUk connection being established, thereby implementing the method for signaling control based on the G.709 multi stage multiplexing.

BRIEF DESCRIPTION OF DRAWINGS

FIG. 10 is a schematic diagram of coding for carrying the multi stage multiplexing method.

FIG. 11 is an example of specific coding of HOP_ATTRIBUTES with respect to the multi stage multiplexing of ODU0-ODU2-ODU3.

FIG. 12 is an example of specific coding values of HOP_ATTRIBUTES with respect to the multi stage multiplexing of ODU0-ODU3-ODU4.

FIG. 13 is an example of specific coding values of HOP_ATTRIBUTES with respect to the multi stage multiplexing of ODU0-ODU1-ODU2-ODU3-ODU4.

PREFERRED EMBODIMENTS OF THE PRESENT INVENTION

The present invention will be further described in combination with the accompanying drawings and specific examples below.

An OTN standard always supports single level ODU multiplexing. A subsequent result in OTN v1 is that ODU1 is mapped directly to a branch timing sequence of ODU3, which is not required to be firstly mapped to an ODU2. A motivation of the system architecture is to reduce complexity. In a normal evolution process of the system architecture, the newly added OTN functions are expected to have higher rates, and thus the concept of single stage multiplexing will be propelled forward more easily. That is to say, if all the rates increase upward, it may be very easy to continue to use the single stage multiplexing in the OTN system architecture. An ODU0 and an ODUflex are introduced in the OTN layer architecture, which makes the newly added ODUk signal rates much lower than the existing rates, and this will bring some different challenges for the newly added rates can be clients of the existing rates. Therefore, an extremely distinct application exists, two level multiplexing is expected to assist that signals of ODU0 and ODUflex are introduced in the existing network, and thus it is not required to update each node in the existing network. When the two level multiplexing is used in one domain, operators can be permitted to apply limitations of new rates only on those nodes which need to support these new rates. One OTN may be a client layer of another OTN. For example, an operator A may have an OTN which consists of a low order ODUi and a high order ODUj (i<j), the high order ODUj of the operator A is borne to an operator B through an OTUj, and the operator B takes the ODUj as a low order ODUj to be born to a high order ODUk (j<k). Inside the operator A or operator B, two layers of the ODU exist, but the high order ODUj in the operator A becomes the low order ODUj in the operator B.

The two level multiplexing is expected to assist to introduce the signals of ODU0 and ODUflex into the existing network, and thus it is not required to update each node in the existing network. However, it is required to introduce Gateway network elements to support multi stage multiplexing.

Figure 1:
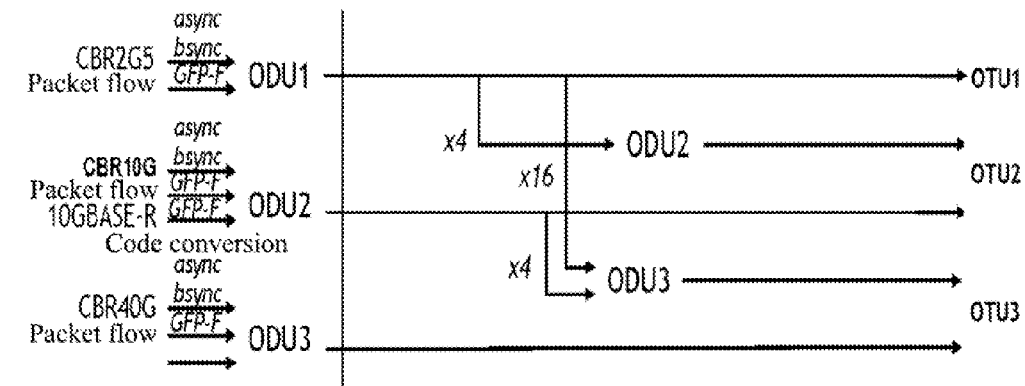
FIG. 1 is a mapping and multiplexing structure hold by the G.709 standard published in 2003.
Figure 2:
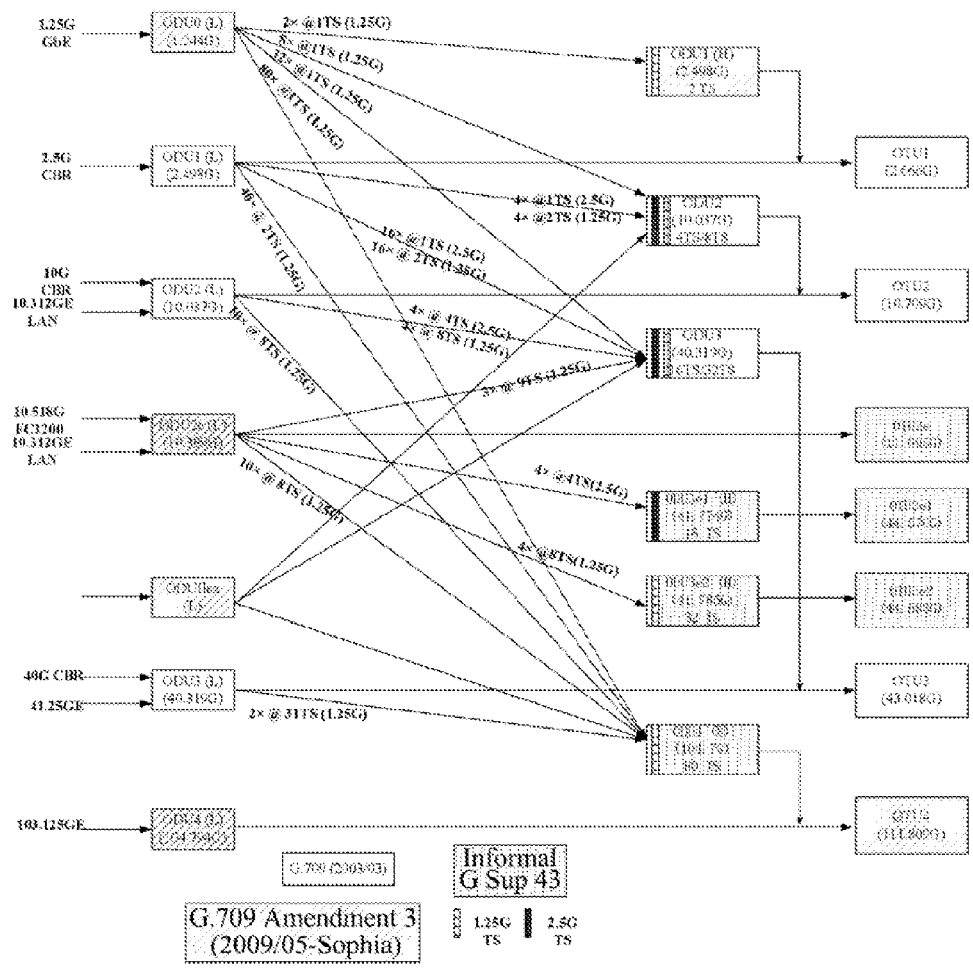
FIG. 2 is a mapping and multiplexing structure hold by the G.709 Amendment3 and G.sup 43 standard.
Figure 3:
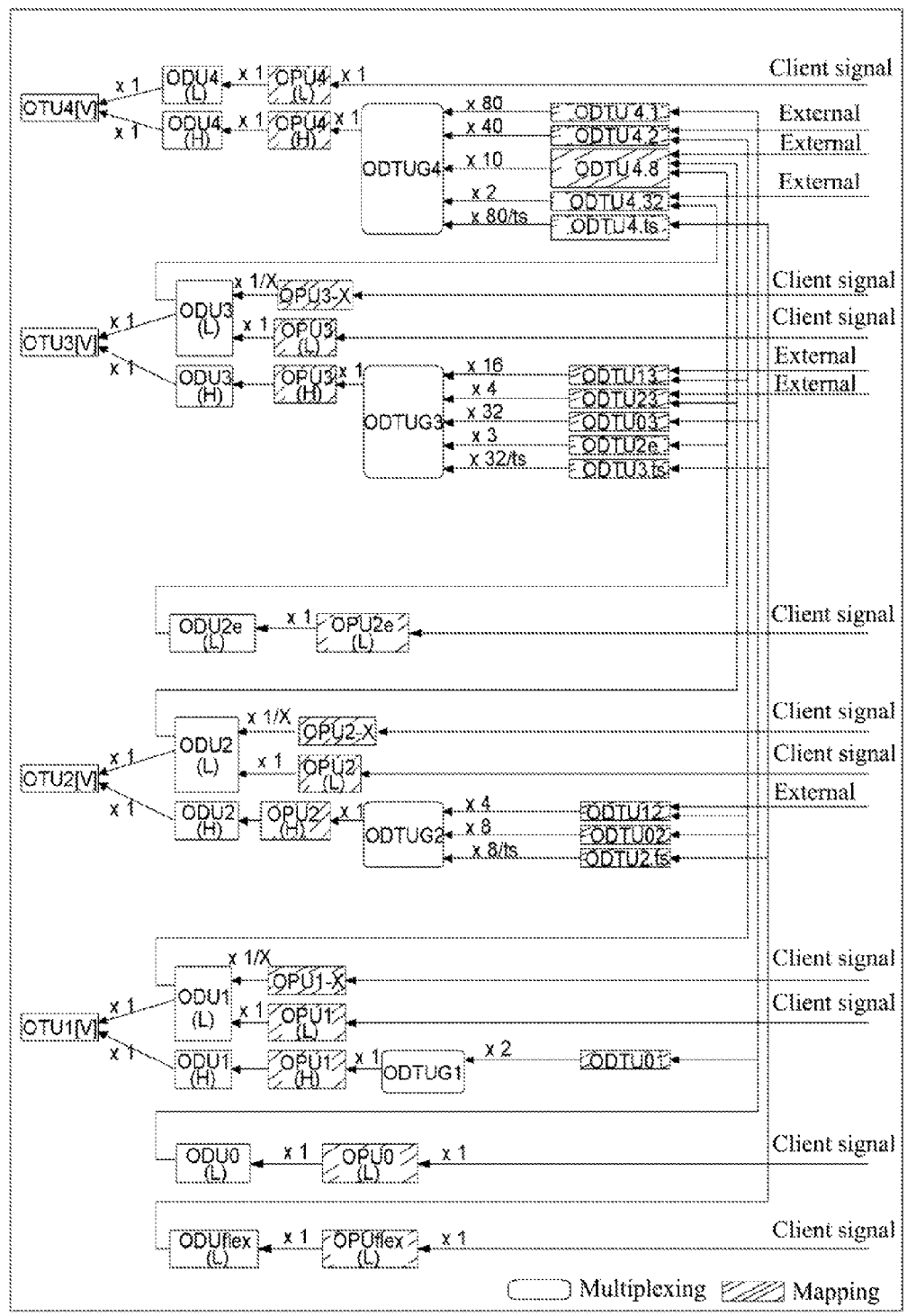
FIG. 3 is a detailed mapping and multiplexing structure of the G.709 standard and G.sup 43 standard.
Figure 4:
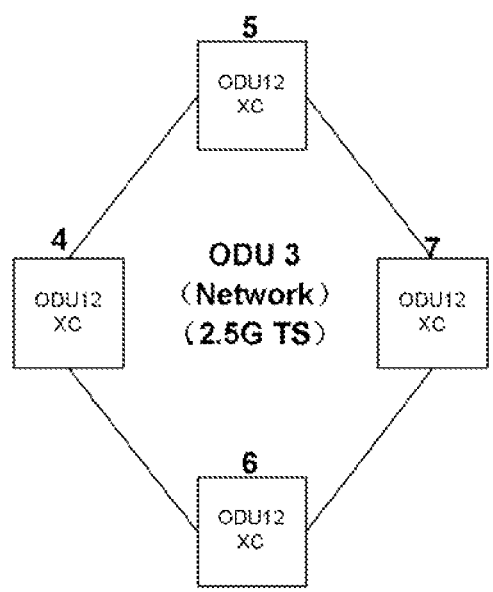
FIG. 4 is an OTN which has been invested and deployed by the operators, the implementation of all node devices in the network is based on the G.709 standard released in 2003, and each node in the network does not support the ODU0 and $ODU_{flex}$ and is based on the 2.5G branch timing sequence.

In order to introduce the signals of ODU0 and ODUflex in the existing network shown in FIG. 4, and thus it is not required to update all the nodes (4, 5, 6 and 7) deployed in the existing network, by introducing the Gateway network elements or upgrading the existing certain network elements as gateway network elements, the Multi stage Multiplexing is implemented on these gateway network elements, which assists to introduce applications of ODU0 and ODUflex in the deployed network, solves the interconnection between the network supporting a 1.25G TS and the deployed network supporting a 2.5G TS, and completes the conversion between a 1.25G TS signal and a 2.5G TS signal. The existing OTN network of the operators is protected, and new ODUk applications can also be introduced in the existing OTN network.

Figure 5:
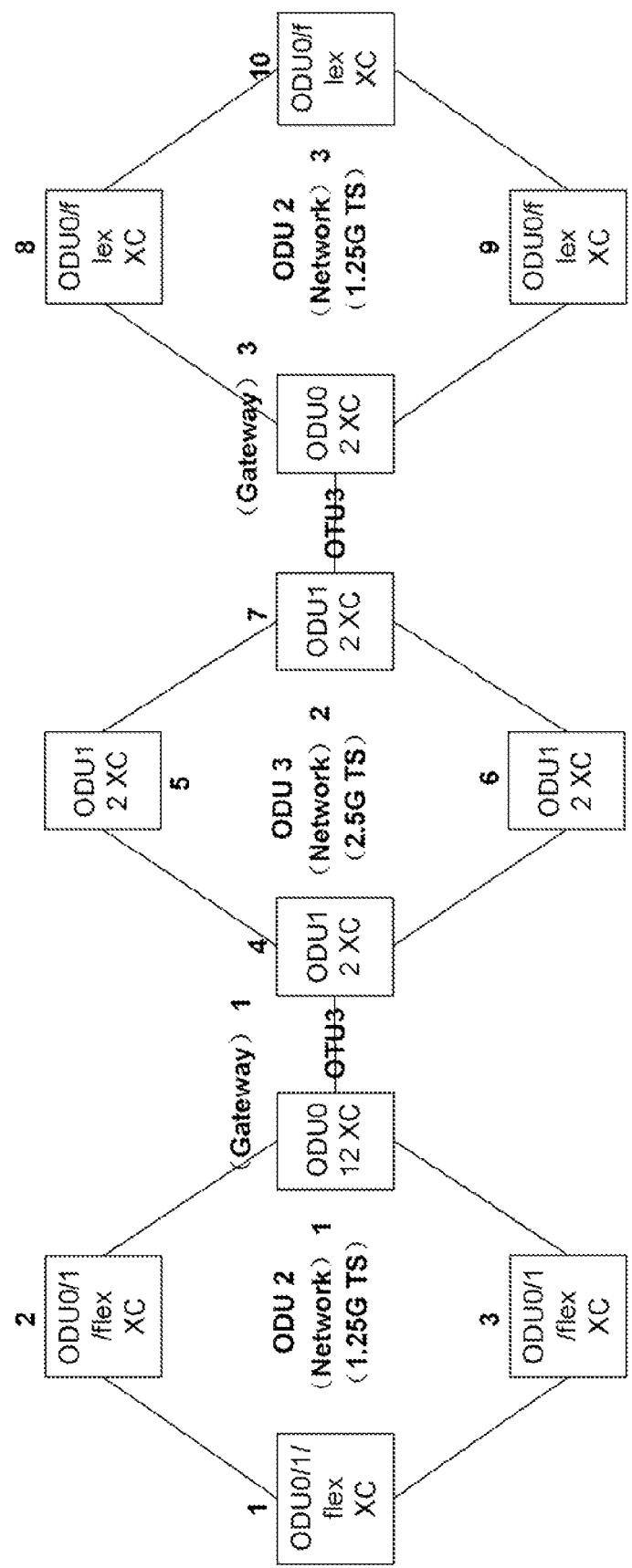
FIG. 5 is a network structure of introducing gateway network elements supporting multi stage multiplexing in order to add an OTN device supporting signals of ODU0 and ODUflex to the existing network shown in FIG. 4, since the gateway network elements are introduced, it is not required to update each node in the existing network.

As shown in FIG. 5, on these Gateway network elements, the ODU0 is firstly mapped to the ODU1 or ODU2, and then the ODU1/ODU2 are mapped to the ODU3 immediately. Other nodes (4, 5, 6 and 7) in an ODU3 Network 2 are not required to see the ODU0 but switch the ODU1 or ODU2 directly, which protects the existing network of the operators, and also can introduce new applications and services to perform value-added services on the existing network of the operators.

Figure 6:
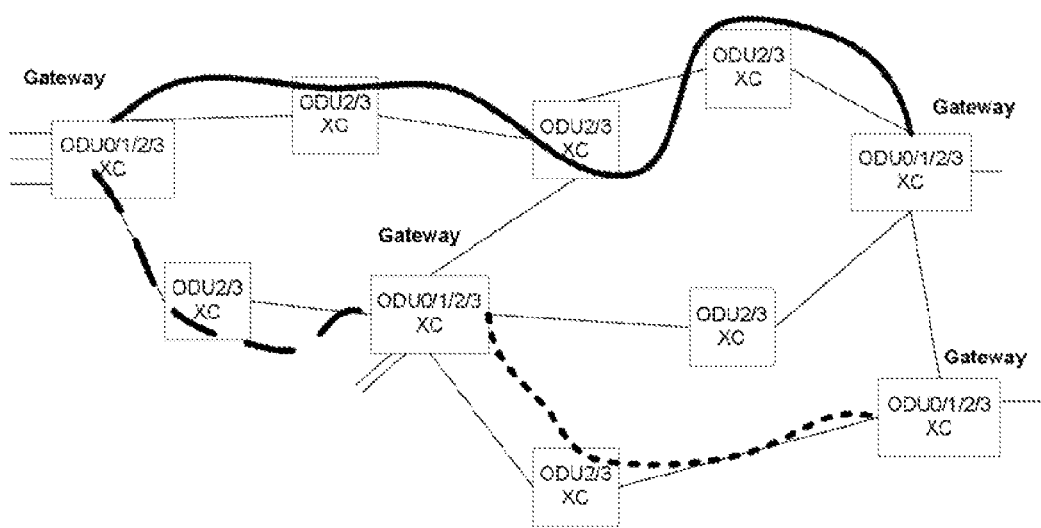
FIG. 6 is a structure diagram of an OTN of the network design based on tunnels, Gateway network elements are introduced, and the ODU0 and ODUflex are firstly multiplexed to the ODU2 or ODU3 to minimize the number of connections required to be established at intermediate nodes.

Except a network upgrade scenario, the second potential two-level multiplexing application is a network design based tunnels. In an ODU4 network, each ODU4 has 80 branch timing sequences. It is assumed that a large number of ODU0s and ODUflexs need 3~4 branch timing sequences. If a great quantity of circuit services share the same terminal point (or even a part of the whole path), from a management perspective, the Gateway network elements are introduced, and the ODU0 and ODUflex are firstly multiplexed to the ODU2 or ODU3 to minimize the number of connections required to be established at intermediate nodes. The ODU2/ODU3 effectively establish a tunnel used by the ODU0/ODUflex and going through the ODU4 network. In the ODU4 network as shown in FIG. 6, the ODU0/ODUflex are only visible to non gateway network elements. Though the two level multiplexing increases the complexity of gateway network elements, the two stage multiplexing reduces the number of cross connections required to be configured at other non gateway network element nodes.

A management plane and a control plane use the related art to obtain detailed information of each link in the OTN, and the information includes a granularity size of branch timing sequence supported by the link, the maximum number of the supported branch timing sequences (i.e. the maximum bandwidth of the link), the number of available branch timing sequences of the current link and a low order signal type which can be supported by the link. However, with regard to links located between a Gateway 1 and node 4 and between a Gateway 3 and node 7 in FIG. 7, since the ODU0 can be mapped to the ODU3 Network 2 through the two level multiplexing (that is, the ODU0 can be mapped to the ODU1 or ODU2, and then the ODU1 or ODU2 are mapped to the ODU3), if only low order signals supported by these links are known, it is not enough for a path computation entity to compute routing, and it is also required to know the way in which the ODU0 is mapped to the ODU3 Network 2, that is, multi stage multiplexing capabilities supported by the links between the Gateway 1 and node 4 and between the Gateway 3 and node 7 must be known by the path computation entity. Therefore, before computing an end-to-end ODUk service at the management plane or the control plane, multi stage multiplexing capability restriction information of the gateway network elements in the network must be obtained. In addition, the path computation entity in the control plane can obtain the multi stage multiplexing capabilities of the network elements by expanding an autodiscovery protocol or a routing protocol.

The path computation entity uses the obtained multi stage multiplexing capability restriction information of the gateway network elements for path computation of the end-to-end ODUk service. In the routing computation process, when the end-to-end ODUk service goes through multiple gateway network elements, the path computation entity must select a corresponding multi stage multiplexing capability and demultiplexing capability on these gateway network elements for the end-to-end ODUk service.

Figure 7:
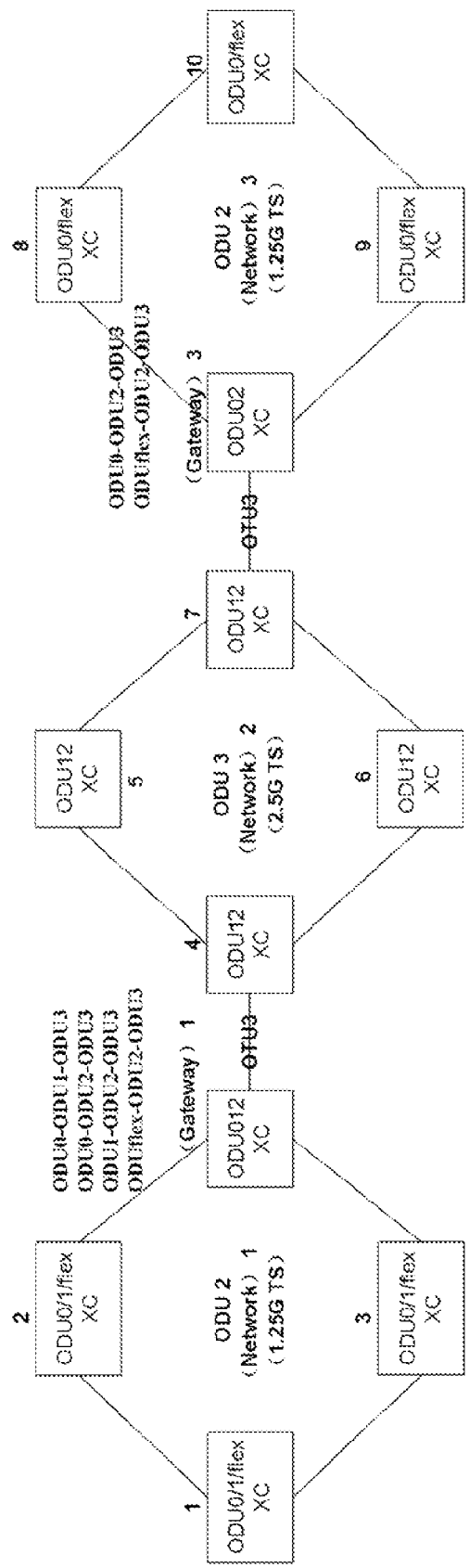
FIG. 7 is a network structure of introducing gateway network elements supporting multi stage multiplexing in order to add an OTN device supporting signals of ODU0 and ODUflex to the existing network shown in FIG. 4, and multi stage multiplexing capabilities supported by the gateway network elements are different.

Meanwhile, as shown in FIG. 7, when an end-to-end service of the ODU0/ODUflex needs to go through the ODU3 Network 2, since the network can not support ODU0/ODUflex switching, the ODU0 is firstly mapped to the ODU1 or ODU2 in the gateway network elements, and then the ODU1/ODU2 are mapped to the ODU3 immediately; the nodes of the ODU3 Network 2 are not required to see the ODU0 but switch the ODU1 or ODU2 directly. Therefore, a tunnel of the ODU1 or ODU2 needs to be firstly established between the Gateway 1 and Gateway 3, that is to say, an ODUj connection (i>j) with a rate higher than that of an end-to-end ODUi connection, which is to be established and is to be borne, needs to be established between a pair of interrelated gateway network elements. Since the path computation entity can know the multi stage multiplexing capabilities selected in the passed gateway network elements, the path computation entity knows the gateway network elements between which the related tunnels are required to be established, and each pair of gateway network elements for which the tunnels need to be established can be appointed explicitly in a signaling message. Furthermore, an ODUj connection (i<j) with a rate higher than that of the end-to-end ODUi connection, which is to be established and required to be borne, is established between a pair of appointed and interrelated gateway network elements. In the present invention, it is raised that when the control plane establishes the end-to-end ODUk service in a distributed signaling mode, the signaling message carries the multi-stage multiplexing/demultiplexing capability information selected by the path computation entity on the gateway network element. When the signaling (Path or Resv) message carrying the selected multi-level multiplexing/demultiplexing capability information on the gateway network element goes through the gateway network elements, the carried multi stage multiplexing method is configured to a data plane for an end-to-end ODUk connection being established.

As shown in FIG. 7, after introducing the Gateway network elements in the existing network and deploying OTN device nodes implemented according to the latest version of G.709 standard, two 10G OTN and one 40G OTN are constituted, the granularity size of branch timing sequence supported by each link in the 10G OTN is 1.25G TS. Wherein, the two 10G are interconnected with the 40G OTN through the gateway network elements of the Gateway 1 and Gateway 3, and links between the two 10G OTN and the 40G OTN are OTU3 links. The switching capacities supported by the nodes in the two 10G OTN are also different, wherein the nodes 1, 2 and 3 and the Gateway 1 in an ODU2 Network 1 only support the switching capacities of the ODU0, ODU1 and ODUflex. The nodes 8, 9 and 10 and the Gateway 3 in an ODU2 Network 3 only support the switching capacities of the ODU0 and ODUflex, the reason is that the operators only want the ODU2 Network 3 to be responsible for accessing services of 1 GigE (ODU0) and 10 GigE (ODU2/ODU2e) only, thus only performing ODU0/ODU2 switching is more economic and it is unnecessary to perform ODU1 switching. The multi stage multiplexing capabilities supported by the gateway network elements are shown as follows.

The multi stage multiplexing capabilities supported by the Gateway 1 include:
ODU0-ODU1-ODU3
ODU0-ODU2-ODU3
ODU1-ODU2-ODU3
ODUflex-ODU2-ODU3

The multi stage multiplexing capabilities supported by the Gateway 3 include:
ODU0-ODU2-ODU3
ODUflex-ODU2-ODU3

Meanwhile, the Gateway 1 and Gateway 3 both support the following single level multiplexing capabilities:
ODU1-ODU3
ODU2-ODU3

Before the control plane establishes an end-to-end GigE (ODU) through a distributed signaling, the path computation entity uses the obtained multi stage multiplexing capability restriction information of the gateway network elements for the path computation of the end-to-end ODUk service. In the routing computation process, when the end-to-end ODUk service goes through multiple gateway network elements, the path computation entity selects the corresponding multi stage multiplexing capability and demultiplexing capability on these gateway network elements for the end-to-end ODUk service.

Figure 8:
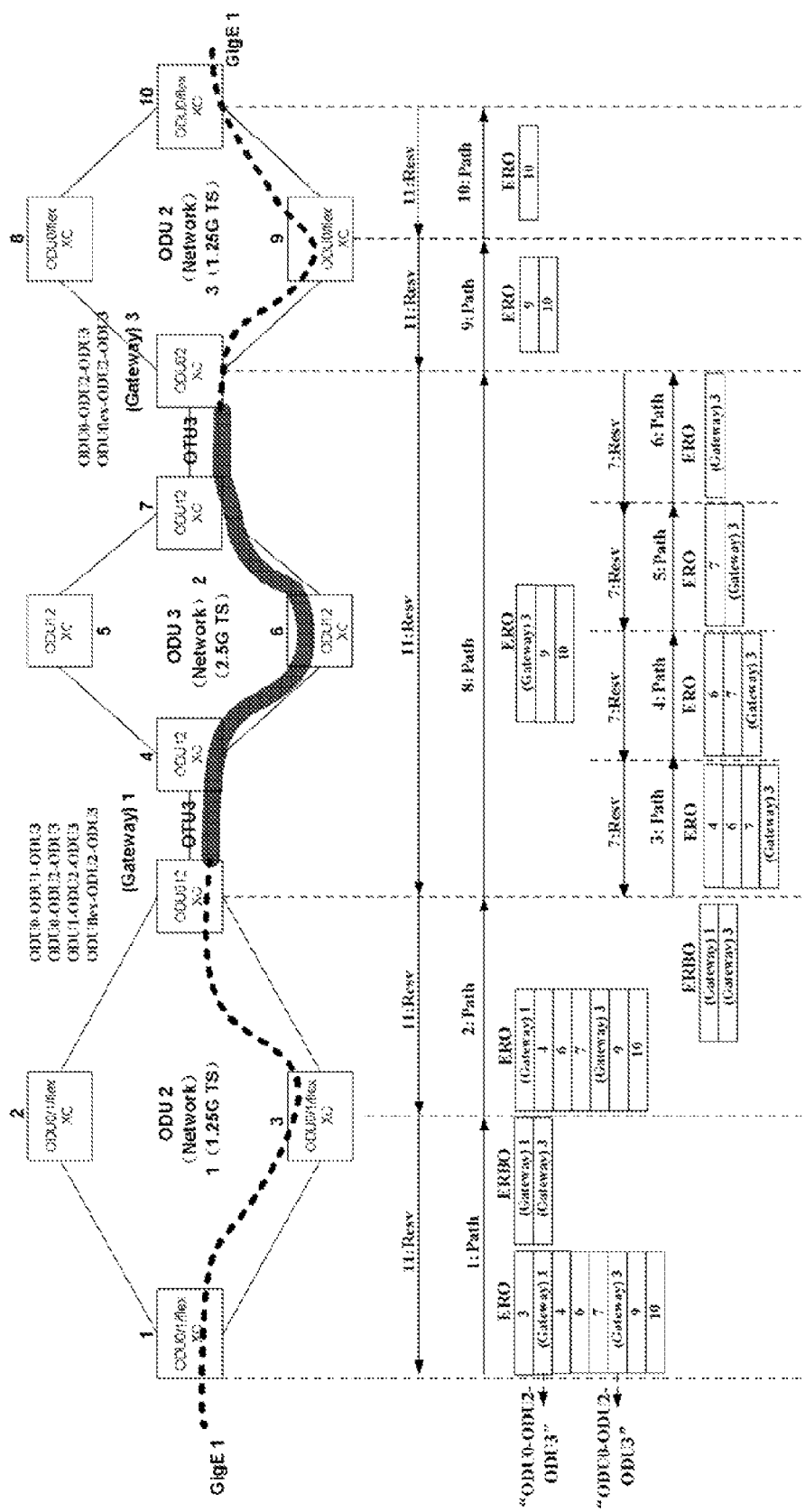
FIG. 8 is a schematic diagram of signaling control of an end-to-end ODU0 service based on FIG. 7.
Figure 9:
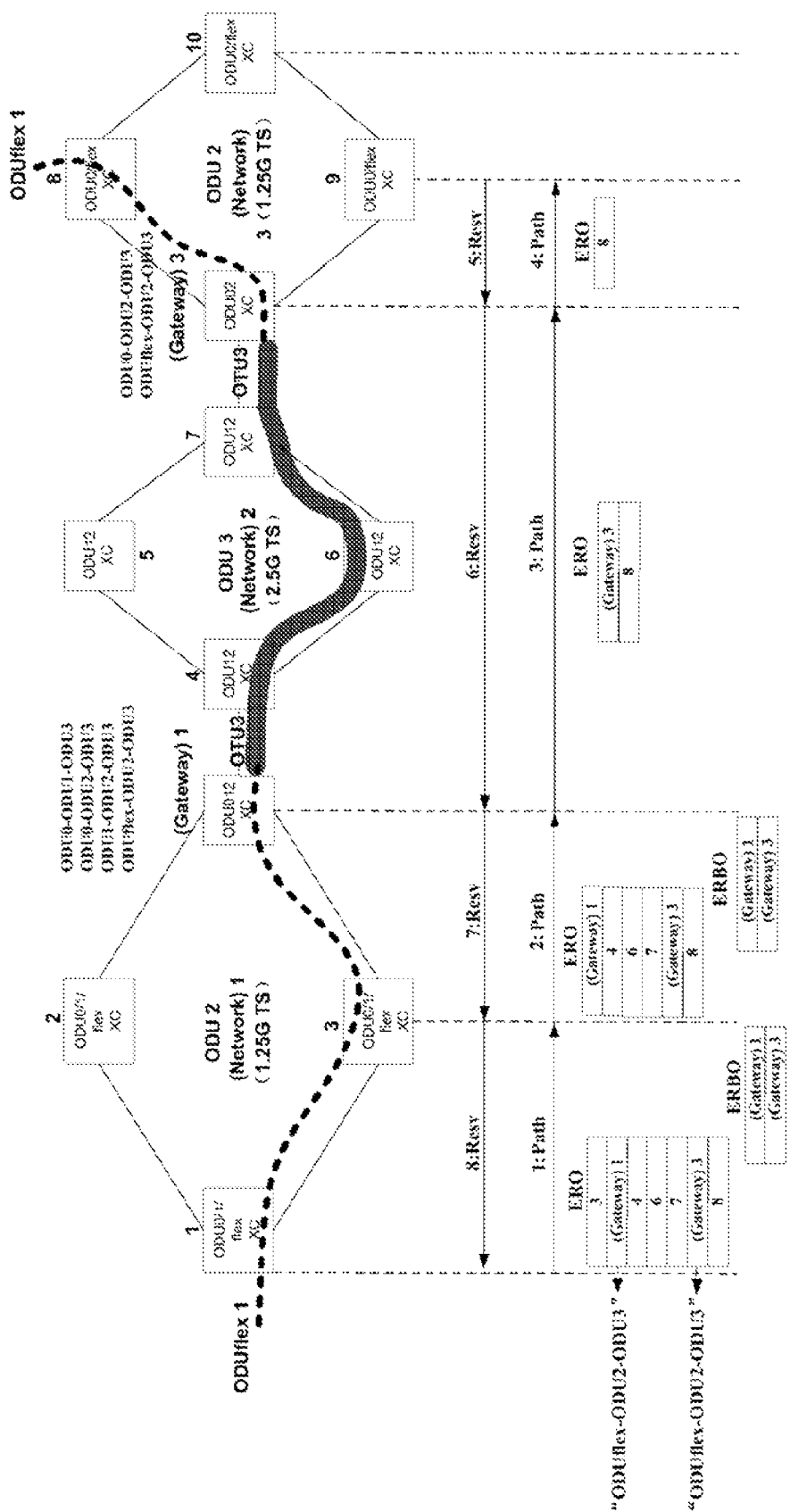
FIG. 9 is a schematic diagram of signaling control of an end-to-end $ODU_{flex}$ service based on FIG. 7.

As shown in FIG. 8, the path computation entity receives the following end-to-end service establishment request: an end-to-end GigE (ODU0) service between the node 1 and the node 10, and the service is marked as a GigE 1. After receiving the end-to-end service establishment request, the path computation entity uses the related art to compute an available end-to-end routing, e.g., the passed nodes are 1, 3, Gateway 1, 4, 6, 7, Gateway 3, 9 and 10. Since the Gateway 3 only supports the two level multiplexing capability and demultiplexing capability of the ODU0-ODU2-ODU3 with respect to an ODU0 service. Therefore, though the Gateway 1 supports the multiplexing capability and demultiplexing capability of the ODU0-ODU1-ODU3 and ODU0-ODU2-ODU3, the path computation entity can only select the multi stage multiplexing capability and demultiplexing capability of the ODU0-ODU2-ODU3 on the Gateway 1 and Gateway 3 for the end-to-end ODU0 service, otherwise signals can not be transmitted from end to end.

After the path computation is completed, the nodes and links passed by the end-to-end services and the multi stage or single level multiplexing/demultiplexing capabilities selected on the gateway network elements are determined, and it is required to configure these end-to-end services through the distributed signaling of the control plane.

After obtaining the above related information of the path computation entity, the control plane initiates a signaling establishment process of the end-to-end ODUk service.

The control plane needs to carry the multi stage multiplexing capabilities (such as the ODU0-ODU2-ODU3) selected by the path computation entity on the gateway network elements (such as the Gateway 1 and Gateway 3) in signalings (Path and Resv), and appoints to establish relevant tunnels explicitly between two gateway network elements such as the Gateway 1 and Gateway 3 in the signalings at the same time.

When the signaling message (Path) reaches the gateway network element (such as the Gateway 1), an ODUj (j>i) connection (such as the ODU2) with higher rates which can bear the end-to-end ODUi connection (such as the ODU0) is triggered to be established between the gateway network elements (such as between the Gateway 1 and Gateway 3).

When the tunnel establishment of the ODUj is finished, the establishment process of the ODUi connection is recovered.

After a Path message or a Resv message of establishing the ODUi connection reaches another gateway network element, the multi stage multiplexing capabilities (such as the ODU0-ODU2-ODU3) carried in the signaling (such as the Path message or the Resv message) are configured to the corresponding gateway network elements.

The present invention provides a method for signaling control for service establishment based on G.709, which includes:

after obtaining routing information of an end-to-end service to be established, information of a gateway network element on end-to-end service routing and a selected multi stage multiplexing capability on the gateway network element, a control plane initiating an end-to-end connection establishment process, and sending an end-to-end connection establishment signaling to nodes passed by the end-to-end service routing, wherein, the end-to-end connection establishment signaling contains the multi stage multiplexing capability selected on the gateway network element passed by the end-to-end service routing, and configures a corresponding multi stage multiplexing capability on a corresponding gateway network element.

Wherein, the end-to-end connection establishment signaling further carries the following information: appointing each pair of gateway network elements for which tunnels need to be established.

Wherein, when the end-to-end connection establishment signaling reaches the gateway network element, the control plane configures the multi stage multiplexing capability carried in the end-to-end connection establishment signaling on the gateway network element; or, when the end-to-end connection establishment signaling reaches the gateway network element, the multi stage multiplexing capability carried in the end-to-end connection establishment signaling is saved on the gateway network element, and the gateway network element configures the saved multi stage multiplexing capability when an end-to-end connection establishment response signaling reaches the gateway network element. A user presets a policy, and according to the policy, it is decided to configure the multi stage multiplexing capability when the end-to-end connection establishment signaling is received or when the end-to-end connection establishment response signaling is received.

Wherein, the end-to-end connection establishment signaling is a Path message, and the end-to-end connection establishment response signaling is a Resv message.

Wherein, the control plane carries the multi stage multiplexing capability selected on the gateway network element on a subject of the gateway network element recorded in an explicit route object or an Explicit Route Boundary Object (ERBO).

Wherein, attribute information is inserted into the subject, the attribute information is used to carry the multi stage multiplexing capability selected on the gateway network element, and the attribute information contains a type field, a length field, a multi stage multiplexing layer number information field and a multi stage multiplexing signal type field, wherein:

the type field is used to: indicate a type of the attribute information;

the length field is used to: indicate lengths of the multi stage multiplexing layer number information field and the multi stage multiplexing signal type field;

the multi stage multiplexing layer number information field is used to: indicate a number of layers of multi stage multiplexing; and the multi stage multiplexing signal type field is configured to: indicate each signal type for the multi stage multiplexing.

Example 1

In the example, a specific flow of configuring an end-to-end service when the end-to-end service is established between a node 1 and node 10 in the network shown in FIG. 7 is described, and the following steps are included.

In step 101, a path computation entity replies routing information, the passed nodes are 1, 3, Gateway 1, 4, 6, 7, Gateway 3, 9 and 10, passed by an end-to-end GigE service to a control plane, and selects the multi stage multiplexing capability ODU0-ODU2-ODU3 on the Gateway 1 and Gateway 3.

In step 102, the control plane uses a routing result computed by the path computation entity to initiate a signaling process of end-to-end ODU0 connection establishment, and carries the routing information, gateway network elements passed by the routing and the multi stage multiplexing capabilities selected on the gateway network elements in an ODU0 connection establishment signaling. Wherein, an Explicit Region Object (ERO) can be used to carry the routing information, and an Explicit Route Boundary Object (ERBO, of which an object format definition is the same as that of the ERO) can be used to carry the gateway network elements passed by the routing.

Specifically, the node 1 sends a Path message to the node 3, ERO={3, Gateway 1, 4, 6, 7, Gateway 3, 9, 10} and ERBO={Gateway 1, Gateway 3} are carried. Meanwhile, in subjects of the Gateway 1 and Gateway 3 carried in the ERO, a multi stage multiplexing method ODU0-ODU2-ODU3 selected by the path computation entity on these two gateway network elements is carried, and the specific execution methods and steps will be described in the example 3.

In step 103, when the Path message reaches the gateway network element Gateway 1, the Gateway 1 establishes an ODU2 tunnel connection located between the Gateway 1 and Gateway 3.

In step 104, after the establishment of ODU2 connection located between the Gateway 1 and Gateway 3 is completed, the Gateway 1 continues the establishment process of the ODU0 connection, and obtains the multi stage multiplexing method from the Path message of establishing the ODU0 connection. The Gateway 1 configures the multi stage multiplexing method to a data plane of Gateway 1 node. The configuration of multi stage multiplexing also can be performed after the Gateway 1 receives a Resv message, and at the point, the Gateway 1 needs to save the multi stage multiplexing method obtained from the Path message in the Gateway 1 node, and after the Resv message is received, if the Gateway 1 still does not configure the multi stage multiplexing capabilities yet, the locally saved multi stage multiplexing capabilities are configured to the data plane.

Specifically, whether the multi stage multiplexing is configured when the Path message is received or when the Resv message is received can be configured by a user (a network operation staff) through a corresponding policy configured on the gateway network element.

In step 105, after the Path message of establishing the ODU0 connection reaches the Gateway 3, the Gateway 3 obtains information of the multi stage multiplexing method from the Path message of establishing the ODU0 connection, and configures the multi stage multiplexing method to the data plane on the Gateway 3 node. The configuration of the multi stage multiplexing method also can be performed after the Gateway 3 receives the Resv message, at the point, the Gateway 3 needs to save the multi stage multiplexing method obtained from the Path message into the Gateway 3 node, and after the Resv message is received, if the Gateway 3 still does not configure the multi stage multiplexing method yet, the locally saved multi stage multiplexing method is configured to the data plane. Specifically, whether the multi stage multiplexing is configured when the Path message is received or when the Resv message is received can be determined by a user (a network operation staff) through a corresponding policy configured on the node.

Example 2

When a path computation entity receives the following end-to-end service establishment request: an end-to-end $ODU_{flex}$ service between a node 1 and a node 8, the service is marked as an $ODU_{flex}$ 1, and the bandwidth demand is 5*1.25G. The $ODU_{flex}$ 1 service and the GigE 1 service in the example 1 go through the same pair of gateway network elements. In order to fully use bandwidth resources of an ODU3 Network 2, the $ODU_{flex}$ 1 service and the GigE 1 service share a section of ODU2 tunnel, and the available bandwidth satisfies the bandwidth demand of the $ODU_{flex}$ 1. Therefore, after receiving the end-to-end service establishment request, the path computation entity uses the related art to compute an available end-to-end routing, e.g., the passed nodes are 1, 3, Gateway 1, 4, 6, 7, Gateway 3 and 8. Since the Gateway 1 and Gateway 3 only support the two level multiplexing capability and demultiplexing capability of the ODU-flex-ODU2-ODU3 with respect to an $ODU_{flex}$ service, the path computation entity can select the multi stage multiplexing method ODUflex-ODU2-ODU3 on the Gateway 1 and Gateway 3 for the end-to-end $ODU_{flex}$ service.

In step 201, the path computation entity replies routing information, the passed nodes are 1, 3, Gateway 1, 4, 6, 7, Gateway 3 and 8, passed by an end-to-end ODUflex 1 service to a control plane, and selects the multi stage multiplexing capability ODU0-ODU2-ODU3 on the Gateway 1 and Gateway 3.

In step 202, the control plane uses a routing result computed by the path computation entity to initiate a signaling process of end-to-end $ODU_{flex}$ connection establishment, and carries the routing information, gateway network elements passed by the routing and the multi stage multiplexing capabilities selected on the gateway network elements in an ODU- $_{flex}$ connection establishment signaling. An ERO can be used to carry the routing information, and an ERBO can be used to carry the gateway network elements passed by the routing. The method for carrying the information can specifically refer to the patent application METHOD FOR CONTROLLING REGION BOUNDARY IN MULTI-LAYER NETWORK, METHOD AND SYSTEM FOR ESTABLISHING CONNECTIONS.

Specifically, a pair of boundary nodes (Gateway 1, Gateway 3) of an ODU2 tunnel is carried in the ERBO; the node 1 sends a Path message to the node 3, ERO={3, Gateway 1, 4, 6, 7, Gateway 3, 8} and ERBO={Gateway 1, Gateway 3} are carried. Meanwhile, in subjects of the Gateway 1 and Gateway 3 carried in the ERO, a multi stage multiplexing method ODUflex-ODU2-ODU3 selected by the path computation entity on these two gateway network elements is carried, and the specific execution methods and steps will be described in the example 3.

In step 203, when the Path message reaches the gateway network element Gateway 1, the Gateway 1 needs to establish an ODU2 connection located between the Gateway 1 and Gateway 3. However, since the ODU2 connection has been established in the example 1, the Gateway 1 is not required to initiate the establishment process of the signaling.

In step 204, after the ODU2 connection located between the Gateway 1 and Gateway 3 has existed, the Gateway 1 continues the establishment process of the $ODU_{flex}$ connection, and obtains information of the multi stage multiplexing method from the Path message of establishing the $ODU_{flex}$ connection. The Gateway 1 configures the multi stage multiplexing method to a data plane on a Gateway 1 node.

Wherein, the configuration of multi stage multiplexing also can be performed after the Gateway 1 receives a Resv message, at the point, the Gateway 1 needs to save the multi stage multiplexing method obtained from the Path message in the Gateway 1 node, and after the Resv message is received, if the Gateway 1 still does not configure the multi stage multiplexing capabilities yet, the locally saved multi stage multiplexing capabilities are configured to the data plane. Whether the policy that the multi stage multiplexing is configured when the Path message is received or when the Resv message is received can be configured by a user (a network operation staff) on the nodes.

In step 205, after the Path message of the $ODU_{flex}$ connection reaches the Gateway 3, the Gateway 3 obtains the information of the multi stage multiplexing method from the Path message of establishing the $ODU_{flex}$ connection, and configures the multi stage multiplexing method to the data plane on a Gateway 3 node.

Wherein, the configuration of the multi stage multiplexing method also can be performed after the Gateway 3 receives the Resv message, in this case, the Gateway 3 needs to save the multi stage multiplexing method obtained from the Path message in the Gateway 3 node, and after the Resv message is received, if the Gateway 3 still does not configure the multi stage multiplexing capabilities yet, the locally saved multi stage multiplexing capabilities are configured to the data plane. Policies whether the multi stage multiplexing are configured when the Path message is received or when the Resv message is received can be configured by a user (a network operation staff) on the nodes.

Example 3

In the present invention, it is required to carry multi stage multiplexing capability information selected by a path computation entity for the passed gateway network elements in a signaling message (Path or Resv).

A method for carrying the multi stage multiplexing capability information is: in an Explicit Route Object (ERO) or an Explicit Route Boundary Object (ERBO), embedding the multi stage multiplexing capability information used on the gateway network elements and selected by the path computation entity in a subject of the ERO or ERBO of marking the gateway network element.

A specific embodiment of embedding the multi stage multiplexing capability in the subject is: in the subject of the ERO or ERBO marking the gateway network element, inserting attribute information following behind the subject of a node identifier or an interface index identifier, such as HOP_ATTRIBUTES, wherein the HOP_ATTRIBUTES contain a multi stage multiplexing method selected by the path computation entity for a connection being established on an interface of the gateway network element.

A detailed coding mode of the HOP_ATTRIBUTES is given below, and as shown in FIG. 10, a Type field, a Length field, a multi stage multiplexing layer number information (Num) field and a multi stage multiplexing signal type field (Multi States Multiplexing Sub-TLV field) are included, wherein:

the Type field is marked as 5, other values also can be used according to the need, and no limitation is made with respect to this in the present invention;

the Length field is used to: indicate lengths of the Num field and the Multi Stages Multiplexing Sub-TLV field;

the Num field is used to: indicate layers of multi stage multiplexing, which can be indicated using 3 (other values also can be used according to the need, and no limitation is made with respect to this in the present invention) bits. For example, when ODU0-ODU2-ODU3 is required to be indicated, 2 is filled in the Num, it means that two layers are multiplexed/demultiplexed; and the Multi Stages Multiplexing Sub-TLV field is used to: indicate signal types of the multi stage multiplexing, wherein, every 4 bits indicates a certain ODUk (k=0, 1, 2, 2e, flex, 3, 4). One coding mode of the 4 bits is shown as follows:

0000:ODU0
0001:ODU1
0010:ODU2
0011: ODU3
0100:ODU4
0101:ODU2*e*
0110:ODUflex

The above coding mode is only the examples, and no limitation is made with respect to this in the present invention.

According to the above coding mode, a Length field value is 3+(Num+1)*4.

With respect to the multi stage multiplexing of ODU0-ODU2-ODU3, specific coding values of the HOP_ATTRIBUTES are as shown in FIG. 11. Wherein, a Type field value is 5, a Length field value is 15, a Num field value is 010, and a Multi Stages Multiplexing Sub-TLV field value is 0000 0010 0011.

With respect to the multi stage multiplexing of ODU0-ODU3-ODU4, specific coding values of the HOP_ATTRIBUTES are as shown in FIG. 12. Wherein, a Type field value is 5, a Length field value is 15, a Num field value is 010, and a Multi Stages Multiplexing Sub-TLV field value is 0000 0011 0100.

With respect to the multi stage multiplexing of ODU0-ODU1-ODU2-ODU3-ODU4, specific coding values of the HOP_ATTRIBUTES are as shown in FIG. 13. Wherein, a Type field value is 5, a Length field value is 23, a Num field value is 100, and a Multi Stages Multiplexing Sub-TLV field value is 0000 0001 0010 0011 0100.

In addition, in the above examples of the method for signaling control for service establishment based on G.709, the multi stage multiplexing capability selected on the gateway network element means the multi stage multiplexing capability selected for the gateway network element.

The present invention also provides a system for signaling control for service establishment based on G.709, and the system includes a control plane and a gateway network element, wherein:

the control plane is configured to: after obtaining routing information of an end-to-end service to be established, information of a gateway network element passed by end-to-end service routing and a multi stage multiplexing capability selected for the gateway network element, initiate an end-to-end connection establishment process, and send an end-to-end connection establishment signaling to nodes passed by the end-to-end service routing, wherein the end-to-end connection establishment signaling contains the multi stage multiplexing capability selected for the gateway network element passed by the end-to-end service routing;

the gateway network element is configured to: perform configuration according to a corresponding multi stage multiplexing capability.

Wherein, the end-to-end connection establishment signaling further carries the following information: appointing each pair of gateway network elements for which tunnels need to be established.

Wherein, the gateway network element is configured to: when the end-to-end connection establishment signaling reaches, perform configuration according to the multi stage multiplexing capability carried in the end-to-end connection establishment signaling; or when the end-to-end connection establishment signaling reaches, save the multi stage multiplexing capability carried in the end-to-end connection establishment signaling, and perform configuration according to the saved multi stage multiplexing capability when an end-to-end connection establishment response signaling reaches.

Wherein, the gateway network element is further configured to: according to a policy preset by a user, decide to perform configuration according to the multi stage multiplexing capability when the end-to-end connection establishment signaling reaches or the end-to-end connection establishment response signaling reaches.

Wherein, the end-to-end connection establishment signaling is a Path message, and the end-to-end connection establishment response signaling is a Resv message.

Wherein, the control plane is configured to: carry the multi stage multiplexing capability selected for the gateway network element on a subject of the gateway network element recorded in an explicit route object or an Explicit Route Boundary Object (ERBO).

Wherein, the control plane is configured to: insert attribute information into the subject, and use the attribute information to carry the multi stage multiplexing capability selected on the gateway network element, wherein the attribute information contains a type field, a length field, a multi stage multiplexing layer number information field and a multi stage multiplexing signal type field, wherein:

the type field is configured to: indicate a type of the attribute information;

the length field is configured to: indicate lengths of the multi stage multiplexing layer number information field and the multi stage multiplexing signal type field;

the multi stage multiplexing layer number information field is configured to: indicate a number of layers of multi stage multiplexing; and the multi stage multiplexing signal type field is configured to: indicate each signal type of the multi stage multiplexing.

With the above signaling control system for service establishment based on G.709, the interconnection between old devices and new devices is better implemented, which can introduce new services, and also can protect network resources which have been deployed by the operators.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

INDUSTRIAL APPLICABILITY

With the signaling control method and system for service establishment based on G.709 provided by the present invention, when the control plane establishes an end-to-end service in a distributed signaling mode, a signaling message carries multilevel multiplexing/demultiplexing capability information selected by a path computation entity for the gateway network element. When the signaling (Path or Resv) message carrying the multi-level multiplexing/demultiplexing capability information selected for the gateway network element goes through the gateway network element, the carried multi stage multiplexing capability information is configured to a data plane, which implements the signaling control based on the G.709 multi stage multiplexing, thereby implementing the interconnection between old devices and new devices.

What is claimed is:

1. A method for signaling control for service establishment based on G.709, comprising:

a control plane obtaining routing information of an end-to-end service to be established, information of a gateway network element passed by end-to-end service routing and a multi stage multiplexing capability selected for the gateway network element, initiating an end-to-end connection establishment process, and sending an end-to-end connection establishment signaling to nodes passed by the end-to-end service routing, wherein, the end-to-end connection establishment signaling contains the multi stage multiplexing capability selected for the gateway network element passed by the end-to-end service routing, and the gateway network element performs configuration according to a corresponding multi stage multiplexing capability;

wherein the end-to-end connection establishment signaling further carries the following information: appointing each pair of gateway network elements for which tunnels need to be established.

2. The method according to claim 1, wherein, in the step of the gateway network element performing configuration according to a corresponding multi stage multiplexing capability, when the end-to-end connection establishment signaling reaches the gateway network element, the gateway network element performs configuration according to the multi stage multiplexing capability carried in the end-to-end connection establishment signaling; or when the end-to-end connection establishment signaling reaches the gateway network element, the multi stage multiplexing capability carried in the end-to-end connection establishment signaling is saved on the gateway network element, and the gateway network element performs configuration according to the saved multi stage multiplexing capability when an end-to-end connection establishment response signaling reaches the gateway network element.

3. The method according to claim 2, wherein, the method further comprises:
a user presets a policy, and the gateway network element decides to perform configuration according to the multi stage multiplexing capability when receiving the end-to-end connection establishment signaling according to the policy; or
a user presets a policy, and the gateway network element decides to perform configuration according to the multi stage multiplexing capability when receiving the end-to-end connection establishment response signaling according to the policy.

4. The method according to claim 2, wherein, the end-to-end connection establishment signaling is a Path message, and the end-to-end connection establishment response signaling is a Resv message.

5. The method according to claim 1, wherein, in the step of a control plane sending an end-to-end connection establishment signaling to nodes passed by the end-to-end service routing, the control plane carries the multi stage multiplexing capability selected for the gateway network element on a subject of the gateway network element recorded in an explicit route object or an Explicit Route Boundary Object (ERBO).

6. The method according to claim 5, wherein, the step of the control plane carries the multi stage multiplexing capability selected for the gateway network element on a subject of the gateway network element recorded in an explicit route object or an Explicit Route Boundary Object (ERBO) comprises:
inserting attribute information into the subject, using the attribute information to carry the multi stage multiplexing capability selected for the gateway network element, and the attribute information containing a type field, a length field, a multi stage multiplexing layer number information field and a multi stage multiplexing signal type field, wherein:
the type field is configured to: indicate a type of the attribute information;
the length field is configured to: indicate lengths of the multi stage multiplexing layer number information field and the multi stage multiplexing signal type field;
the multi stage multiplexing layer number information field is configured to: indicate a number of layers of multi stage multiplexing; and
the multi stage multiplexing signal type field is configured to: indicate each signal type for the multi stage multiplexing.

7. A system for signaling control for service establishment based on G.709, comprising a control plane and a gateway network element, wherein:
the control plane is configured to: after obtaining routing information of an end-to-end service to be established, information of a gateway network element passed by end-to-end service routing and a multi stage multiplexing capability selected for the gateway network element, initiate an end-to-end connection establishment process, and send an end-to-end connection establishment signaling to nodes passed by the end-to-end service routing, wherein the end-to-end connection establishment signaling contains the multi stage multiplexing capability selected for the gateway network element passed by the end-to-end service routing;
the gateway network element is configured to: perform configuration according to a corresponding multi stage multiplexing capability;
wherein the end-to-end connection establishment signaling further carries the following information: appointing each pair of gateway network elements for which tunnels need to be established.

8. The system according to claim 7, wherein,
the gateway network element is configured to: when the end-to-end connection establishment signaling reaches, perform configuration according to the multi stage multiplexing capability carried in the end-to-end connection establishment signaling; or when the end-to-end connection establishment signaling reaches, save the multi stage multiplexing capability carried in the end-to-end connection establishment signaling, and perform configuration according to the saved multi stage multiplexing capability when an end-to-end connection establishment response signaling reaches.

9. The system according to claim 8, wherein, the gateway network element is further configured to: according to a policy preset by a user, decide to perform configuration according to the multi stage multiplexing capability when the end-to-end connection establishment signaling reaches or the end-to-end connection establishment response signaling reaches.

10. The system according to claim 8, wherein, the end-to-end connection establishment signaling is a Path message, and the end-to-end connection establishment response signaling is a Resv message.

11. The system according to claim 7, wherein, the control plane is configured to: carry the multi stage multiplexing capability selected for the gateway network element on a subject of the gateway network element recorded in an explicit route object or an Explicit Route Boundary Object (ERBO).

12. The system according to claim 11, wherein, the control plane is configured to: insert attribute information into the subject, and use the attribute information to carry the multi stage multiplexing capability selected for the gateway network element, wherein the attribute information contains a type field, a length field, a multi stage multiplexing layer number information field and a multi stage multiplexing signal type field, wherein:
the type field is configured to: indicate a type of the attribute information;
the length field is configured to: indicate lengths of the multi stage multiplexing layer number information field and the multi stage multiplexing signal type field;
the multi stage multiplexing layer number information field is configured to: indicate a number of layers of multi stage multiplexing; and
the multi stage multiplexing signal type field is configured to: indicate each signal type of the multi stage multiplexing.

13. The method according to claim 3, wherein, the end-to-end connection establishment signaling is a Path message, and the end-to-end connection establishment response signaling is a Resv message.

14. The system according to claim 9, wherein, the end-to-end connection establishment signaling is a Path message, and the end-to-end connection establishment response signaling is a Resv message.

* * * * *